United States Patent
Hama et al.

(10) Patent No.: US 9,409,230 B2
(45) Date of Patent: Aug. 9, 2016

(54) PROCESS SCHEDULING SYSTEM, METHOD, AND PROGRAM

(75) Inventors: Toshiyuki Hama, Kanagawa (JP); Takayuki Yoshizumi, Kanagawa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 609 days.

(21) Appl. No.: 13/320,406

(22) PCT Filed: May 6, 2010

(86) PCT No.: PCT/JP2010/057766
§ 371 (c)(1),
(2), (4) Date: Dec. 7, 2011

(87) PCT Pub. No.: WO2010/131596
PCT Pub. Date: Nov. 18, 2010

(65) Prior Publication Data
US 2012/0078407 A1     Mar. 29, 2012

(30) Foreign Application Priority Data
May 13, 2009   (JP) .................................. 2009-116828

(51) Int. Cl.
*B22D 11/12*    (2006.01)
*B21B 37/00*    (2006.01)
(Continued)

(52) U.S. Cl.
CPC ............. *B22D 11/12* (2013.01); *B21B 13/22* (2013.01); *B21B 37/00* (2013.01); *B22D 11/1206* (2013.01); *B22D 11/142* (2013.01)

(58) Field of Classification Search
CPC .. B22D 11/12; B22D 11/1206; B22D 11/142; B21B 37/00

USPC .......................................................... 700/104
See application file for complete search history.

(56) References Cited

U.S. PATENT DOCUMENTS 5,671,403 A  *  9/1997 Shekita et al.
5,671,416 A  *  9/1997 Elson ............................ 717/106
(Continued)

FOREIGN PATENT DOCUMENTS

JP      H07284828 A      10/1995
JP      H105831 A         1/1998
(Continued)

OTHER PUBLICATIONS

Ladurantaye et al., "Scheduling a Hot Rolling Mill", Mar. 2007. The Journal of the Operational Research Society, Published by: Palgrave Macmillan Journals on behalf of the Operational Research Society, vol. 58, No. 3., pp. 288-300.*

(Continued)

*Primary Examiner* — Robert Fennema
*Assistant Examiner* — Steven R. Garland
(74) *Attorney, Agent, or Firm* — Scully, Scott, Murphy & Presser, P.C.; Jennifer Davis, Esq.

(57) ABSTRACT

System, method and computer program product for combined scheduling of two different slab sequences by a rational technique. A two-dimensional grid graph having a direct slab sequence as a first dimension and an inventory slab sequence as a second dimension is prepared by processing of a computer as a data structure represented on a memory or a hard disk drive of the computer. A processing program of the computer generates two child nodes corresponding to a direct slab and an inventory slab, in each node of the two-dimensional graph according to a predetermined algorithm. By defining an appropriate weighting function, the processing program of the computer weights edges between nodes in the two-dimensional grid graph. After forming the weighted graph on a storage device of the computer such as the memory or the hard disk drive, the processing program of the computer calculates a path from a start point to an end point as a shortest path search problem.

18 Claims, 4 Drawing Sheets

(51) Int. Cl.
 *B21B 13/22* (2006.01)
 *B22D 11/14* (2006.01)

(56) References Cited

U.S. PATENT DOCUMENTS

| | | | | |
|---|---|---|---|---|
| 5,808,891 | A * | 9/1998 | Lee et al. | 700/108 |
| 6,356,911 | B1 * | 3/2002 | Shibuya | |
| 6,490,566 | B1 * | 12/2002 | Schmidt | 705/7.26 |
| 2005/0088978 | A1 * | 4/2005 | Zhang | H04L 45/02 370/254 |
| 2006/0020947 | A1 * | 1/2006 | Hallamaa et al. | 719/317 |

FOREIGN PATENT DOCUMENTS

| | | |
|---|---|---|
| JP | 2003305508 | 10/2003 |
| JP | 2004209495 | 7/2004 |
| JP | 2005342787 | 12/2005 |
| JP | 2007222911 | 9/2007 |
| JP | 2008207216 A | 9/2008 |
| JP | 2000167610 | 10/2011 |

OTHER PUBLICATIONS

Ladurantaye et al., "Scheduling a Hot Rolling Mill", The Journal of the Operational Research Society, (Mar. 2007), Published by: Palgrave Macmillan Journals on behalf of the Operational Research Society vol. 58, No. 3; pp. 288-300.*

Lopez et al., The hot strip mill production scheduling problem: A tabu search approach, European Journal of Operational Research, vol. 106, Issues 2-3, Apr. 16, 1998, pp. 317-335.*

Lopez et al., "The hot strip mill production scheduling problem: A tabu search approach", European Journal of Operational Research, vol. 106, Issues 2-3, Apr. 16, 1998, pp. 317-335.*

* cited by examiner

PROCESS SCHEDULING SYSTEM, METHOD, AND PROGRAM

CROSS-REFERENCE TO RELATED APPLICATIONS

The present invention relates to and claims the benefit of the filing date of commonly-owned, co-pending PCT Patent Application No. PCT/JP2010/057766, filed May 6, 2010, which further claims the benefit of priority date of commonly-owned, co-pending Japanese Patent Application No. JP 2009-116828, filed on May 13, 2009, the entire contents and disclosure of which is incorporated by reference as if fully set forth herein.

FIELD OF THE INVENTION

The present invention relates to a technique of determining an arrangement order of a plurality of processing operations, and more particularly relates to a system, a method, and a program that determine a schedule for feeding thick steel plates called slabs to a hot rolling process by rollers.

BACKGROUND ART

Conventionally, ironworks produce steel plates of various thicknesses and sizes by a hot rolling process (also referred to as a hot strip mill process). The hot rolling process is a process of sandwiching a thick steel plate called a slab from above and below by rollers and stretching the slab to produce a thin plate called a coil.

Surface quality of the coil thus produced depends on a surface state of the rollers. When a plurality of slabs are rolled one after another by the rollers, the surface state of the rollers deteriorates gradually. Therefore, a slab required to have high quality is desirably rolled while the rollers are still new.

Moreover, rolling a slab of a certain width may leave a groove as wide as the slab, on a roller surface. This being so, a groove left on a roller surface by a narrow slab rolled earlier may cause a flaw on a wide slab rolled later. Furthermore, in the case of successively rolling two slabs that differ in thickness, the difference in thickness is limited to a predetermined range according to specifications of rolling equipment and the like. Besides, to prevent a decrease in roller durability, thin slabs in particular cannot be successively rolled in large numbers. Thus, various constraints on an order in which slabs are rolled need to be satisfied to maintain slab quality and also improve productivity.

FIG. 1 is a view showing flows of slabs to a hot rolling mill for performing a typical hot rolling process. In detail, as shown in FIG. 1, slabs cast by a direct slab caster 104 are directly fed to a hot rolling mill 102. Here, since the slabs are fed to the hot rolling mill 102 in sequence, it is impossible to change an order in which the slabs are arranged. Note that slabs 106 supplied from the direct slab caster 104 are called direct slabs or DHCR (direct hot charge rolling) slabs.

In general, a hot rolling process in the hot rolling mill 102 is faster than a steelmaking process in the direct slab caster 104. Accordingly, inventory slabs 110 are prepared in a slab yard 108 beforehand, and the direct slabs 106 and the inventory slabs 110 are fed to the hot rolling mill 102 while being combined appropriately, thereby achieving efficient use of the hot rolling mill 102. The slabs rolled in the hot rolling mill 102 are then stored as coils 120.

Note that the inventory slabs 110 are also called HCR/CCR slabs. HCR stands for hot charge rolling and is also called a hot strip, and CCR stands for cold charge rolling and is also called a cold strip.

The reason for calling the inventory slabs 110 by such a mixed name as HCR/CCR slabs is that there are two flows to the inventory slabs 110, namely, a flow of slabs from an inventory slab caster 112 and a flow of slabs from the direct slab caster 104. Of the inventory slabs 110, a HCR slab is a slab that is sent to the hot rolling mill 102 within a predetermined time (24 hours as an example) after tapping, before cooling down sufficiently. A CCR slab, on the other hand, is a slab that has been left for at least five days as an example and has cooled down sufficiently.

In either case, the inventory slabs 110 are too low in temperature to be directly fed to the hot rolling mill 102. Therefore, after scheduling an order of HCR slabs and CCR slabs, these slabs need to be heated in a reheating furnace 114 before being fed to the hot rolling mill 102.

Japanese Unexamined Patent Publication No. 2007-222911 by the applicant of this application discloses a technique of determining a processing operation arrangement order that maximizes slab processing efficiency, especially by solving an integer programming problem. This technique can be applied to scheduling of an order of HCR slabs and CCR slabs in the inventory slabs 110.

Japanese Unexamined Patent Publication No. 2000-167610 relates to a rolling order determination method and a rolling order determination apparatus in hot rolling, and discloses a new rolling order determination method that can optimally schedule heating and rolling while attaching importance to grouping of rolled materials having the same heating condition.

Japanese Unexamined Patent Publication No. 2004-209495 discloses a scheduling method for maximizing a processing capacity in hot rolling in consideration of capacity synchronization between a heating furnace and a rolling mill, rolling constraints, heating constraints, and electric power costs.

Japanese Unexamined Patent Publication No. 2003-305508 relates to a rolling procedure determination method, and discloses the following method. Information including an occupancy time of a rolling mill when rolling is performed is obtained based on a pass schedule of each material to be rolled. With a rolling completion time by which rolling of all materials rolled after passing through a heating furnace is completed being set as a target based on the obtained information, constraints such as an inability to simultaneously perform rolling in the rolling mill are formulated to an optimization problem, the formulated optimization problem is converted to a mixed integer programming problem, and an order of extraction of materials from the heating furnace and an order of rolling in the rolling mill are determined so as to minimize the rolling completion time.

Japanese Unexamined Patent Publication No. 2005-342787 discloses a combination of a schedule target steel information processing apparatus, a simulation apparatus, and an optimal schedule calculation apparatus, where the schedule target steel information processing apparatus stores information about schedule target steel and a physical distribution state of schedule target steel from a steel mill to a hot rolling mill and automatically updates the information via a network, the simulation apparatus receives a current status of schedule target steel from the schedule target steel information processing apparatus and predicts a future physical distribution state, and the optimal schedule calculation apparatus calculates a schedule instruction according to an operation progress status in the hot rolling mill and a future hot rolling arrival state of schedule target steel predicted by the simulation apparatus.

PRIOR ART REFERENCES

Patent Documents

[Patent Document 1]
Japanese Unexamined Patent Publication No. 2007-222911
[Patent Document 2]
Japanese Unexamined Patent Publication No. 2004-209495
[Patent Document 3]
Japanese Unexamined Patent Publication No. 2000-167610
[Patent Document 4]
Japanese Unexamined Patent Publication No. 2003-305508
[Patent Document 5]
Japanese Unexamined Patent Publication No. 2005-342787

SUMMARY OF THE INVENTION

Problems to be Solved by the Invention

The above-mentioned conventional techniques are common techniques for scheduling an order of slabs to be fed to a hot rolling process. However, a direct slab sequence and an inventory slab sequence scheduled by applying the technique such as the one described in Japanese Unexamined Patent Publication No. 2007-222911 are already present separately in the structure shown in FIG. 1, and the above-mentioned conventional techniques do not indicate how to schedule a combined sequence of these slab sequences.

Conventionally, the order of the combined sequence of the direct slab sequence and the inventory slab sequence is determined by humans half by trial and error, which is time-consuming. Besides, there is no versatile combination policy, so that it is difficult to find an optimal scheduling solution.

Therefore, it is an object of the present invention to provide a system and a method for solving combination scheduling of two different slab sequences which are individually scheduled, by a rational technique.

It is another object of the present invention to provide a system and a method for solving combination scheduling of a direct slab sequence and an inventory slab sequence which are individually scheduled beforehand.

Means for Solving the Problems

The present invention was made to solve the stated problems. First, a direct slab sequence and an inventory slab sequence scheduled by an existing technique are prepared and stored in a storage device of a computer such as a hard disk drive in a computer readable data format.

Though the existing technique is used so far, according to the present invention, a two-dimensional grid graph having the direct slab sequence as a first dimension and the inventory slab sequence as a second dimension is prepared by the processing of a computer as a data structure that is loaded on a memory or a hard disk drive of the computer.

A processing program of the computer generates two child nodes corresponding to a direct slab and an inventory slab respectively, in each node of the two-dimensional graph according to a predetermined algorithm.

Each slab of the direct slab sequence and the inventory slab sequence preferably has attributes that are a coil width, a coil thickness, a processable time, a required rolling time, and a slab number.

Moreover, each node of the graph preferably has attributes that are a pointer to a parent slab, a processed direct slab number, a processed inventory slab number, and a processing completion time.

Thus, two child nodes corresponding to a direct slab and an inventory slab are generated from an arbitrary node.

The processing program of the computer weights edges between nodes in the two-dimensional grid graph using the above-mentioned attributes, by defining an appropriate weighting function. At this time, a weight or a cost of each edge is preferably calculated by calculating each of three evaluation indices that are inter-slab connectivity, a hot rolling idle time, and a direct slab wait time, and taking a sum of the calculated evaluation indices to which appropriate weights are assigned.

After the weighted graph is thus formed on the storage device of the computer such as a memory or a hard disk drive, the processing program of the computer calculates a path from a start point to an end point as a shortest path search problem such as known Dijkstra's algorithm. An arbitrary path search algorithm other than Dijkstra's algorithm, such as A*, is also applicable. The path contains all nodes of given direct slabs and inventory slabs, so that a sequence of nodes along the path is a desired combined sequence of direct slabs and inventory slabs.

Data of the combined sequence of direct slabs and inventory slabs obtained in this way is used in a schedule for actually feeding direct slabs from a direct slab caster and inventory slabs from a slab yard to a hot rolling mill in sequence.

Advantages of the Invention

According to the present invention, by forming a grid graph from each of a direct slab sequence and an inventory slab sequence and weighting edges in the graph based on attributes of each individual slab, a combined sequence of direct slabs and inventory slabs can be calculated as a shortest path search problem. This has an advantage of finding an optimal combined sequence solution at high speed.

MODE FOR CARRYING OUT THE INVENTION

Figure 1:
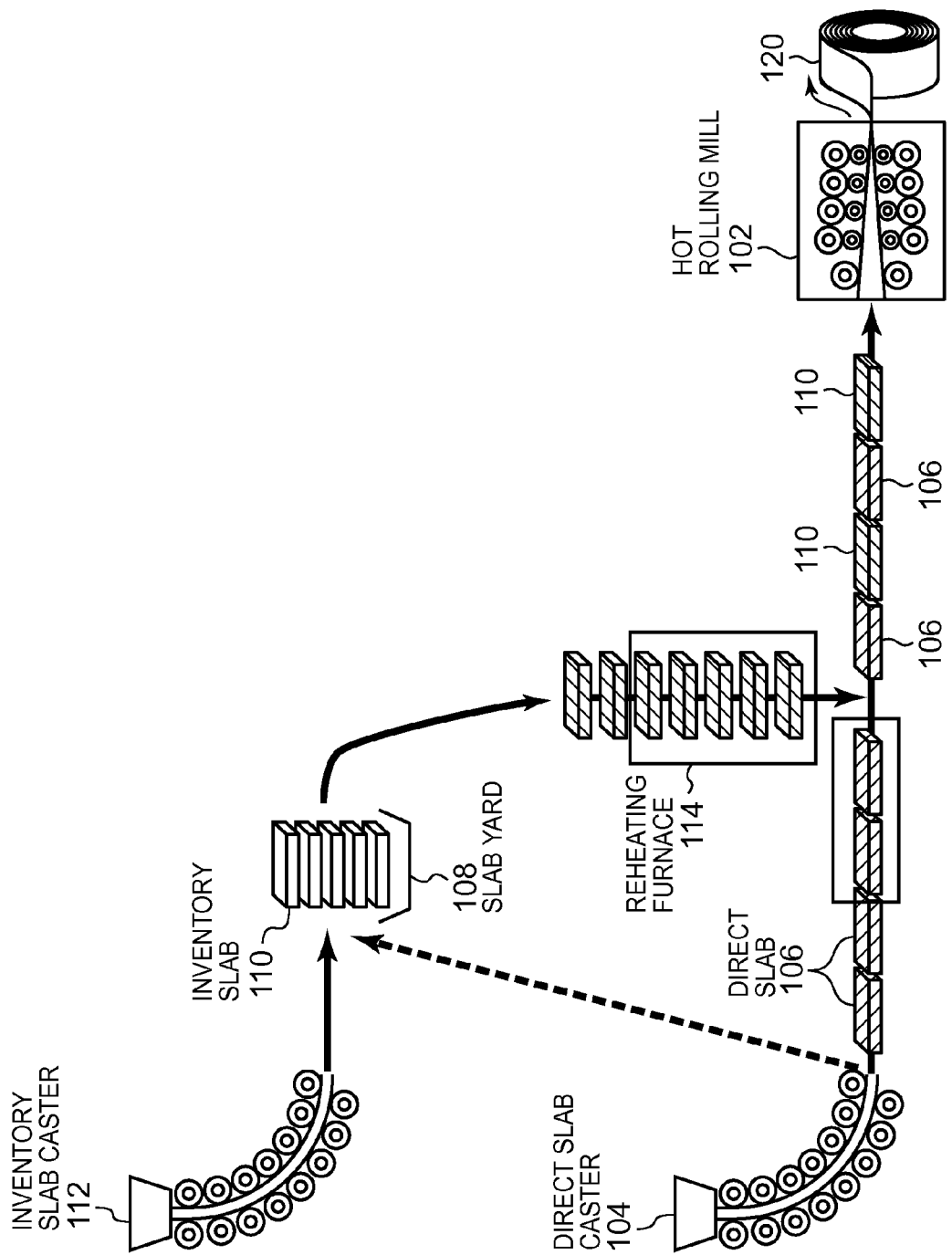
FIG. 1 is a view showing a process of feeding a direct slab sequence and an inventory slab sequence to a hot rolling mill in combination.

An embodiment of the present invention is described below with reference to drawings. The same objects are designated by the same reference numbers in the drawings, unless otherwise indicated. It is to be understood that the following describes merely an embodiment of the present invention, which is not intended to limit the scope of the present invention.

Figure 2:
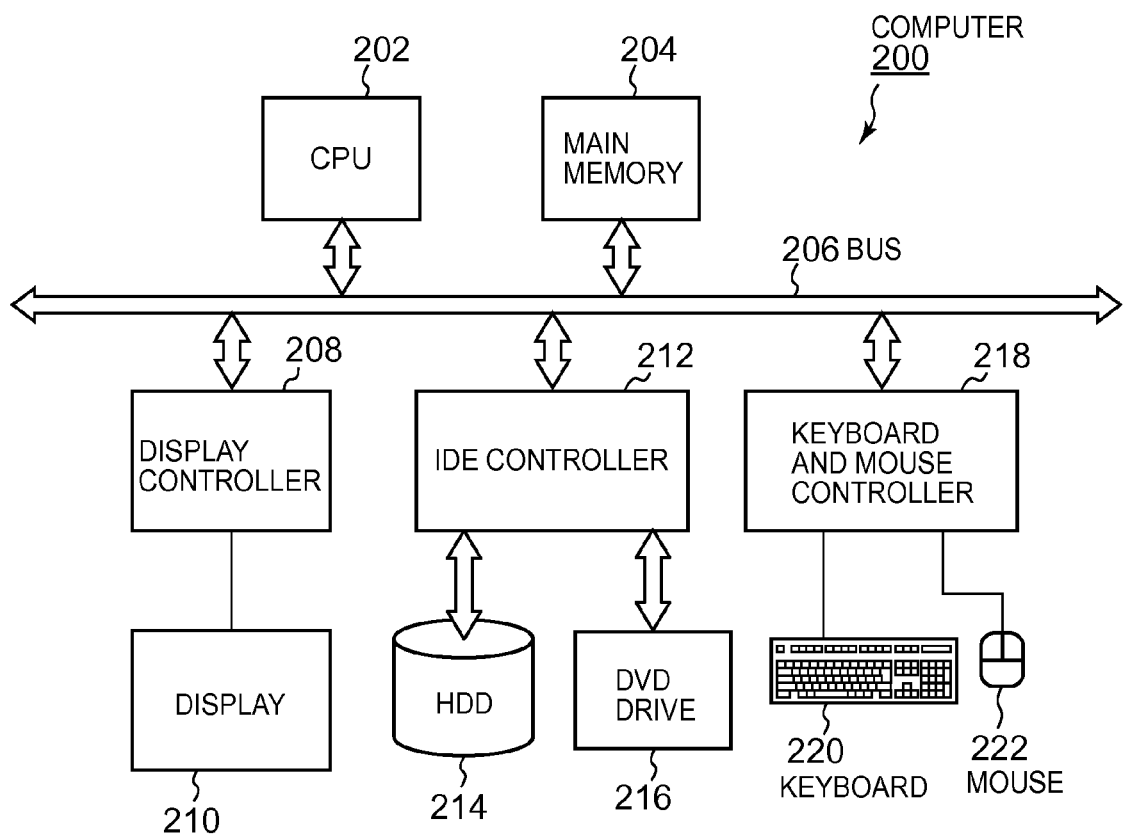
FIG. 2 is a block diagram showing a hardware structure.

FIG. 2 is a block diagram of a hardware structure for implementing the method according to the present invention. In FIG. 2, a computer 200 includes a CPU 202 and a main memory 204 that are connected to a bus 206. The main memory 204 has a storage capacity of 1 GB or more, and preferably 4 GB or more. A larger capacity of the main memory 204 is more preferable for loading all vertex data of a graph described later and the like. The CPU 202 is preferably based on an architecture of 32 bits or 64 bits. For example, Pentium® 4, Core™ 2 DUO, Xeon® by Intel Corporation, Athlon® by AMD, and the like can be used for the CPU 202. A display 210 such as a LCD monitor is connected to the bus 206 via a display controller 208. The display 210 is used to view and edit a program written for processing according to the present invention. The display 210 is also used to display a found path according to the present invention. Moreover, a hard disk drive 214 and a DVD drive 216 are connected to the bus 206 via an IDE controller 212. Programs such as an operating system, a compiler, and the like are stored in the hard disk drive 214 so as to be loadable into the main memory 204. The hard disk drive 214 has a storage capacity of 120 GB or more, and preferably 300 GB or more. The DVD drive 216 is used to additionally introduce a program from a CD-ROM or a DVD into the hard disk drive 214 according to need. Furthermore, a keyboard 220 and a mouse 222 are connected to the bus 206 via a keyboard and mouse controller 218. The keyboard 220 and the mouse 222 are used to write a program for performing processing according to the present invention using a compiler, and executing the program.

A software environment of the computer 200 is described in more detail below. As the above-mentioned operating system, Linux®, Windows XP®, Windows® 2000, and Windows® 2003 servers by Microsoft Corporation, Mac OS® by Apple Inc., and the like can be used, though the operating system is not limited to such. As the compiler for creating the program for processing according to the present invention, Visual Basic®, Visual C++®, Visual Studio® by Microsoft Corporation, Borland® C++ Compiler 5.5, Delphi™, C++ Builder™ by Borland Software Corporation, VisualAge for Java™ by IBM Corporation, and the like capable of running on the operating system used can be arbitrarily adopted. The functions of the present invention can be realized even by a compiler that does not support a GUI and is only CUI-based. These processing systems or tools are stored in the hard disk drive 214, and loaded into the main memory 204 for execution according to need.

Figure 3:
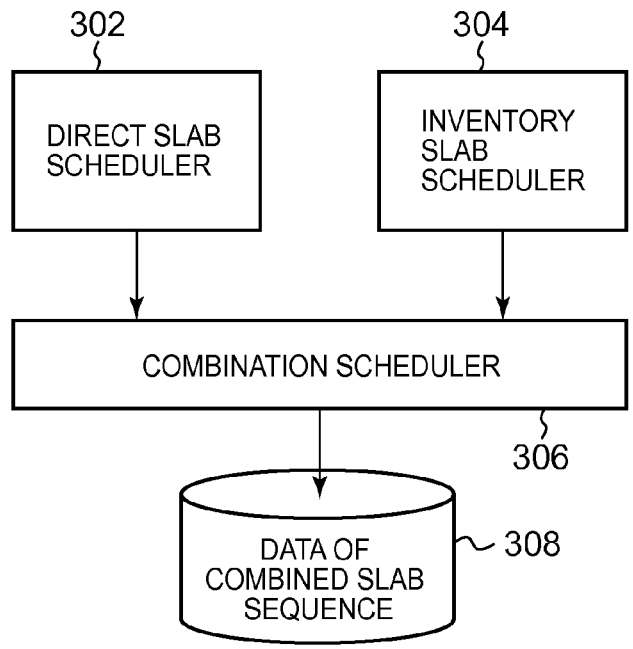
FIG. 3 is a functional block diagram relevant to processing according to the present invention.

FIG. 3 is a functional block diagram of a processing program according to the present invention. In FIG. 3, a direct slab scheduler 302 is a program for scheduling a sequence of direct slabs 106 supplied from the direct slab caster 104. Preferably, the direct slab scheduler 302 is written in any of the processing systems mentioned above, stored in the hard disk drive 214, and loaded into the main memory 204 for execution according to need. For example, the direct slab scheduler 302 determines the sequence of direct slabs 106 using the technique as described in Japanese Unexamined Patent Publication No. 2007-222911, though this is not a limit for the present invention. Data of the determined sequence of direct slabs 106 is stored in the hard disk drive 214 in a computer readable data format, and sent to a combination scheduler 306 described later.

An inventory slab scheduler 304 is a program for scheduling a sequence of inventory slabs 110. Preferably, the inventory slab scheduler 304 is written in any of the processing systems or tools mentioned above, stored in the hard disk drive 214, and loaded into the main memory 204 for execution according to need. For example, the inventory slab scheduler 304 determines the sequence of inventory slabs 110 using the technique as described in Japanese Unexamined Patent Publication No. 2007-222911, though this is not a limit for the present invention. Data of the determined sequence of inventory slabs 110 is stored in the hard disk drive 214 in a computer readable data format, and sent to the combination scheduler 306 described later.

The combination scheduler 306 receives the data of the sequence of direct slabs 106 from the direct slab scheduler 302 and the data of the sequence of inventory slabs 110 from the inventory slab scheduler 304, generates data 308 of a combined sequence of direct slabs 106 and inventory slabs 110 using an algorithm according to the present invention, and preferably stores the data 308 in the hard disk drive 214.

Preferably, the combination scheduler 306 is written in any of the processing systems mentioned above, stored in the hard disk drive 214, and loaded into the main memory 204 for execution according to need.

Before describing the processing of the combination scheduler 306 in detail with reference to a flowchart in FIG. 5 and FIGS. 6 and 7, preconditions for generating the combined sequence of direct slabs 106 and inventory slabs 110 are described below with reference to FIG. 4.

Figure 4:
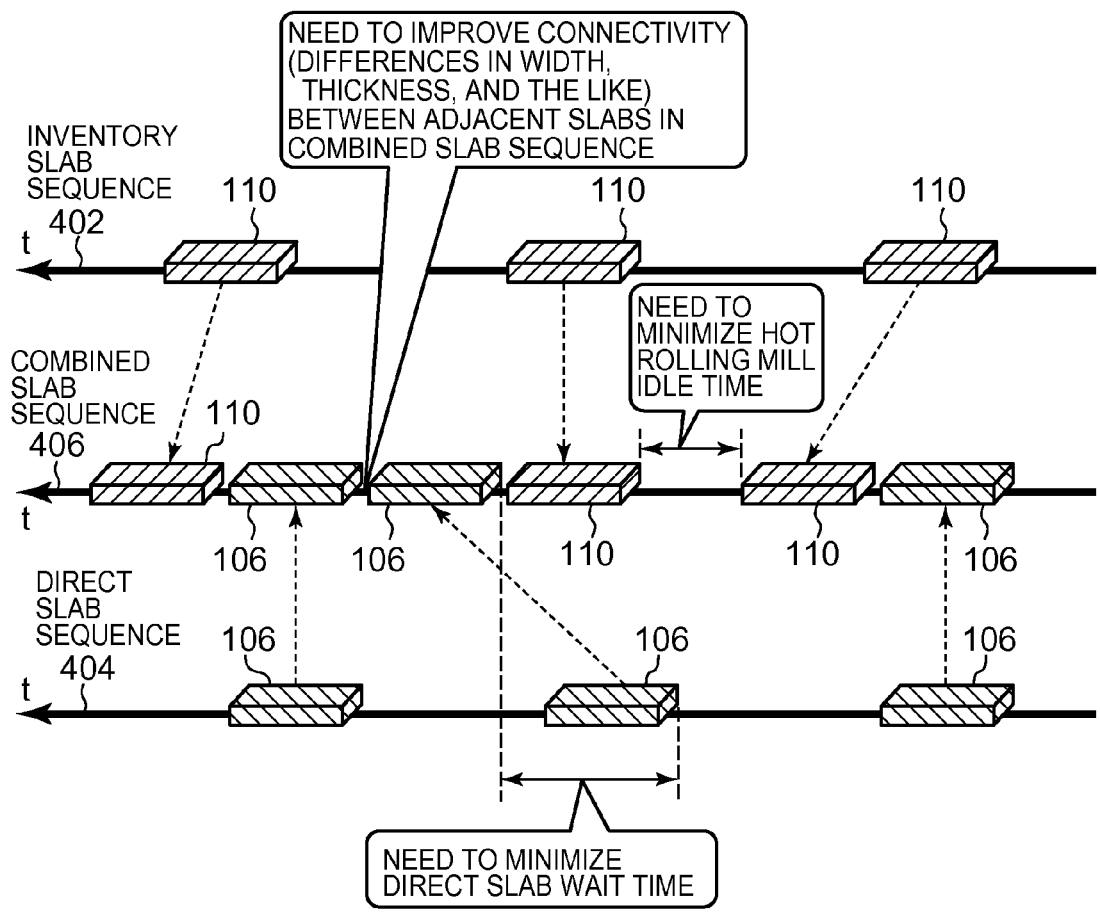
FIG. 4 is a schematic view showing a direct slab sequence and an inventory slab sequence.

In FIG. 4, an inventory slab sequence 402 is a slab sequence generated by the inventory slab scheduler 304, and is formed by an arrangement of a plurality of slabs 110. The inventory slab sequence 402 is made up of hot strip slabs and cold strip slabs, and scheduled by, for example, the technique as described in Japanese Unexamined Patent Publication No. 2007-222911, according to a thickness, a width, a time interval, whether a slab is a hot strip or a cold strip, and the like.

A direct slab sequence 404 is a slab sequence generated by the direct slab scheduler 302, and is formed by an arrangement of a plurality of slabs 106. The direct slab sequence 404 is scheduled by, for example, the technique as described in Japanese Unexamined Patent Publication No. 2007-222911, according to a thickness, a width, a time interval, and the like.

When such an inventory slab sequence 402 and a direct slab sequence 404 are present, in a combined slab sequence 406, first there is a need to improve connectivity (differences in width, thickness, and the like) between adjacent slabs. There is also a need to minimize an idle time of the hot rolling mill. There is further a need to minimize a wait time of direct slabs.

Figure 5:
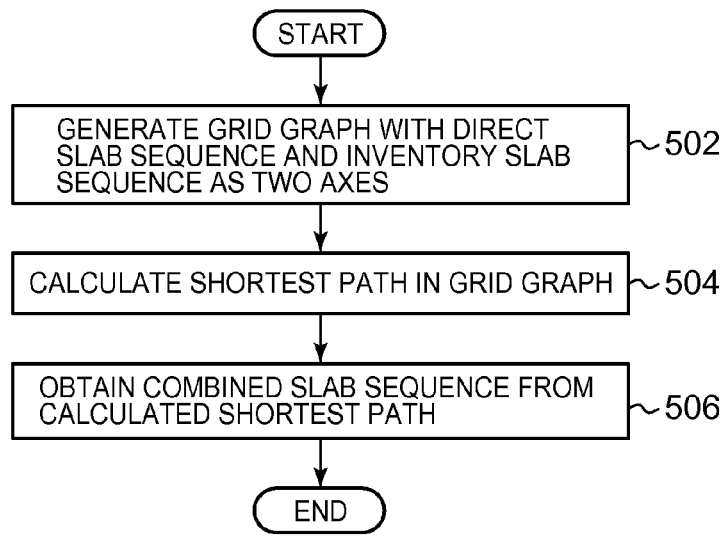
FIG. 5 is a flowchart showing an overview of processing according to the present invention.

The following describes the flowchart in FIG. 5 based on such preconditions. FIG. 5 shows the processing executed by the combination scheduler 306 to generate the combined slab sequence. In step 502, the combination scheduler 306 generates a grid graph using the input direct slabs 106 and inventory slabs 110 as two axes. In detail, as shown in FIG. 6, the direct slab sequence output from the direct slab scheduler 302 is arranged in one axis, and the inventory slab sequence output from the inventory slab scheduler 304 is arranged in the other axis, where grid points formed as a result are nodes 602, 604, 606, 608, 610, 612, 614, 616, 618, . . . in the graph. This graph structure can be written in an appropriate structure such as C, C++, and Java, and can be preferably realized by assigning a structure having two-dimensional coordinates while allocating a storage area on the main memory 204. Alternatively, the graph structure can be written as a permanent data structure stored in the hard disk.

Programming handling of the direct slab sequence and the inventory slab sequence is described below. Let the direct slab sequence denoted by dhcrSlab[n], and the inventory slab sequence by hccrSlab[n], where n is an ordinal number.

Each slab has the following attributes.
width (coil width)
thickness (coil thickness)
availableTime (processable time)
rollingDuration (required rolling time)
sequenceNo (slab number)

Meanwhile, each node has the following attributes.
incomingSlab (pointer to a parent slab)
dhcrNo (processed direct slab number)
hccrNo (processed inventory slab number)
finishingTime (processing completion time)

The reason why a slab and a node have different attributes is described below, with reference to FIG. 7. FIG. 7 shows details of a node in the graph representation in FIG. 6. The node 602 is shown here as a typical example. As shown in the drawing, the node 602 has both a subnode 602a corresponding to an inventory slab and a subnode 602b corresponding to a direct slab.

When one node is made up of two subnodes in this way, a node-to-node transition actually takes one of four paths that are a path from an inventory slab to an inventory slab, a path from an inventory slab to a direct slab, a path from a direct slab to a direct slab, and a path from a direct slab to an inventory slab.

That is, expanding one node generates two child nodes corresponding to a direct slab and an inventory slab. A cost of an edge is calculated by calculating each of the following three evaluation indices using nodes and slabs as arguments, and adding a sum of the evaluation indices to which appropriate weights are assigned. In the case of an edge corresponding to a direct slab, the three evaluation indices are inter-slab connectivity:=Connectivity(node.incomingSlab, dhcrSlab[node.dhcrNo])

hot rolling idle time:=max(dhcrSlab[node.dhcrNo].availableTime−node.finishingTime, 0)

direct slab wait time:=max(node.finishingTime−dhcrSlab[node.dhcrNo].availableTime, 0).

In the case of an edge corresponding to an inventory slab, the three evaluation indices are inter-slab connectivity:=Connectivity(node.incomingSlab, hccrSlab[node.hccrNo])

hot rolling idle time:=max(hccrSlab[node.hccrNo].availableTime−node.finishingTime, 0)

direct slab wait time:=0.

Here, Connectivity is a function that uses two slabs as arguments and returns a cost of connection between them. For instance, the following function can be used (C1 and C2 are appropriate positive constants, and abs is a function that returns an absolute value).

Connectivity(slab1, slab2):=C1*abs(slab1.width−slab2.width)+C2*abs(slab1.thickness−slab2.thickness)

Moreover, a method of calculating each attribute of a child node of a node is as follows. In the case of a direct slab, incomingSlab:=dhcrSlab[node.dhcrNo+1]
finishingTime:=max(node.finishingTime, dhcrSlab[node.dhcrNo+1].availableTime)+dhcrSlab[node.dhcrNo+1].rollingDuration
dhcrNo:=node.dhcrNo+1
hccrNo:=node.hccrNo.

In the case of an inventory slab, incomingSlab:=hccrSlab[node.hccrNo+1]
finishingTime:=max(node.finishingTime, hccrSlab[node.hccrNo+1].availableTime)+dhcrSlab[node.hccrNo+1].rollingDuration
dhcrNo:=node.dhcrNo
hccrNo:=node.hccrNo+1.

Figure 6:
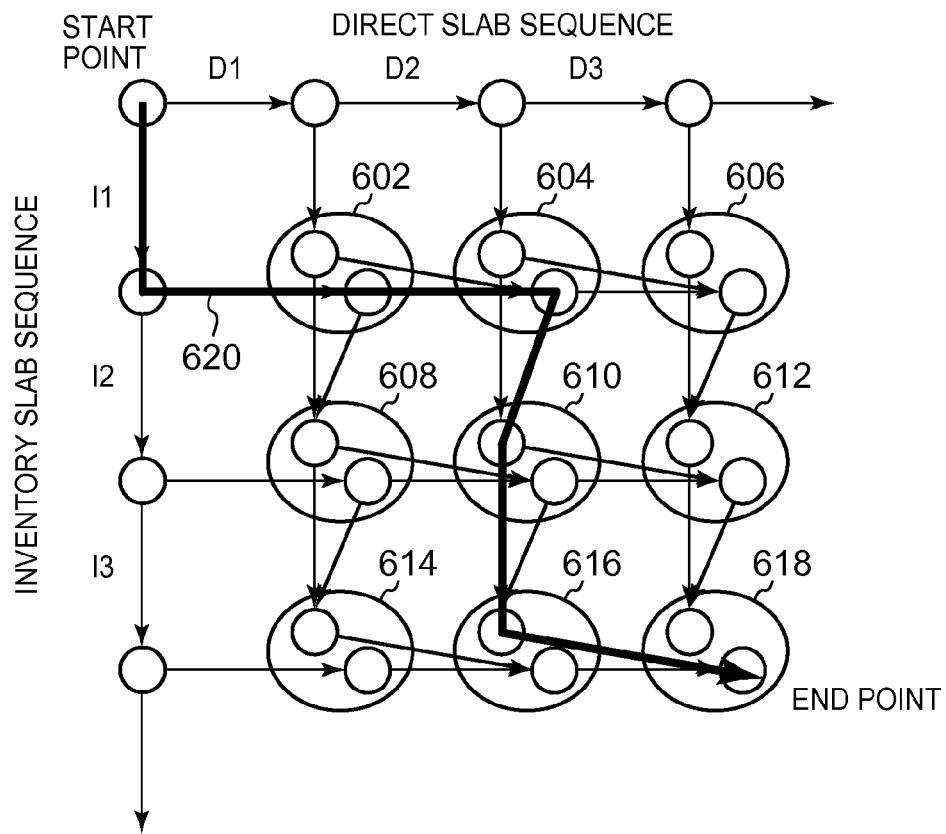
FIG. 6 is a view showing a state where a combined sequence of a direct slab sequence and an inventory slab sequence is determined by a path search technique.
Figure 7:
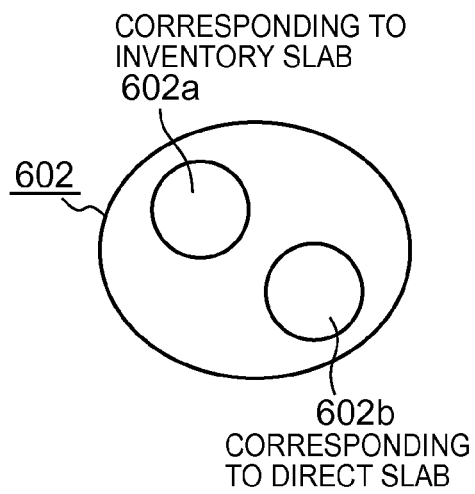
FIG. 7 is a view showing an inventory slab sequence node and a direct slab sequence node in one node.

That is, to generate the graph in FIG. 6, the combination scheduler 306 first generates nodes and assigns attributes to the nodes by using the above-mentioned method of calculating each child node attribute.

Having generated necessary nodes in this manner, the combination scheduler 306 calculates all costs of edges connecting the nodes according to the above-mentioned edge cost calculation method. As a result, the weighted graph as shown in FIG. 6 is formed in a predetermined data structure and stored in the hard disk drive 214. This completes the process in step 502 in FIG. 5.

After generating the weighted graph as shown in FIG. 6, the combination scheduler 306 executes a shortest path search algorithm from a start point to a predetermined end point in step 504.

Upon performing the path search, the following needs to be taken into consideration. Suppose a current search point is at the node 602 in the path search. Since the graph is a grid graph, a next destination is either the node 604 or the node 608.

When the search point is located at the node 602, actually the inventory slab subnode 602a or the direct slab subnode 602b is in a selected state. If the inventory slab subnode 602a is selected in the node 602, in the case of moving to the node 604, an inventory slab subnode 604a cannot be selected and only a direct slab subnode 604b can be selected. This is because the inventory slab subnode 602a in the node 602 and the inventory slab subnode 604a in the node 604 indicate the same inventory slab. In the case of moving to the node 608, however, there is no such a constraint, and any of an inventory slab subnode 608a and a direct slab subnode 608b in the node 608 can be selected.

On the other hand, if the direct slab subnode 602b in the node 602 is selected, in the case of moving to the node 608, the direct slab subnode 608b in the node 608 cannot be selected and only the inventory slab subnode 608a in the node 608 can be selected for the same reason as above. In the case of moving to the node 604, however, there is no such a constraint, and any of the inventory slab subnode 604a and the direct slab subnode 604b in the node 604 can be selected.

As long as the constraints noted above are taken into consideration, any known shortest path search algorithm such as Dijkstra's algorithm, A*, and Floyd-Warshall algorithm can be used. For existing shortest path search algorithms that can be applied, also see Japanese Unexamined Patent Publication No. 2008-157698 by the applicant of this application and the like according to need.

In the path search in FIG. 6, while the start point is determined in advance, the end point is in principle selected so that all slabs of the inventory slab sequence and the direct slab sequence have been passed through when the end point is reached. Reference numeral 620 in FIG. 6 shows an example of a path determined by the shortest path search algorithm.

In step 506, the combination scheduler 306 obtains the combined slab sequence from the calculated shortest path. In the example of FIG. 6, the path is (I1, D1, D2, I2, I3, D3). Data of the combined slab sequence obtained in this way is stored in the hard disk drive 214 and subsequently put to use for actual hot rolling process scheduling.

Though the present invention has been described by way of the embodiment, various changes or modifications can be made to the embodiment, and it should be obvious for a person skilled in the art that such changes or modifications can also be included in the technical scope of the present invention.

DESCRIPTION OF SYMBOLS

106: direct slab
110: inventory slab
302: direct slab scheduler
304: inventory slab scheduler
306: combination scheduler

The invention claimed is:

1. A method for determining a sequence of slabs fed to a hot rolling mill from an inventory slab sequence and a direct slab sequence according to processing of a computer, comprising the steps of:
    representing data of the inventory slab sequence and data of the direct slab sequence on a storage device operatively connected to a processing unit of the computer as a data structure arranged respectively in first and second directions;
    forming a grid graph having intersections as nodes, from the data of the inventory slab sequence in the first direction and the data of the direct slab sequence in the second direction, wherein each node in the grid graph includes both: (a) an inventory slab subnode for an inventory slab in an i position of the inventory slab sequence, wherein i is an integer; and (b) a direct slab subnode for a direct slab in a j position of the direct slab sequence, wherein j is an integer;
    weighting edges in the grid graph based on attributes of each slab in the inventory slab sequence and attributes of each slab in the direct slab sequence, wherein the weighting is performed using three indices that are inter-slab connectivity, a hot rolling idle time, and a direct slab wait time, said weight of each edge in the grid graph being calculated as a function of said three indices, an indice having a direct slab or inventory slab and corresponding direct slab subnode or inventory slab subnode as arguments;
    determining a combined slab sequence of the inventory slab sequence and the direct slab sequence, by a shortest path search through a sequence of nodes from a start point to an end point in the weighted grid graph, said shortest path search traversing through either one of: said inventory slab subnode or said direct slab subnode at each node of said sequence;
    wherein said processing unit performs one or more said forming, weighting and determining;
    wherein the inter-slab connectivity is determined by the function:
    connectivity(slab1, slab2):=C1*abs(slab1.width−slab2.width)+C2*abs(slab1.thickness−slab2.thickness); and wherein slab1.width is width of slab1, slab2.width is width of slab 2, slab1.thickness is thickness of slab1, slab2.thickness is thickness of slab2, and
    wherein C1 and C2 are positive constants and abs is a function that returns an absolute value; and using the combined slab sequence to schedule feeding slabs to the hot rolling mill.

2. The method according to claim 1, wherein the shortest path search is Dijkstra's algorithm.

3. The method according to claim 1, further comprising performing by said processing unit
    a step of generating a child node corresponding to an inventory slab and a child node corresponding to a direct slab, respectively for the inventory slab subnode and the direct slab subnode.

4. The method according to claim 3, further comprising: calculating a child node attribute for each said child node corresponding to an inventory slab and corresponding to a direct slab, at least one of said three indices being a function of said child node attribute.

5. The method according to claim 1, wherein a node-to-node transition takes one of four paths in said weighted graph.

6. The method according to claim 1, wherein said function of said three indices is a summation of the three indices to which a weight is assigned.

7. The method according to claim 1, wherein said weight of each edge in the grid graph is a value that varies along a continuum based upon said three indices.

8. A non-transitory computer program product for determining a sequence of slabs fed to a hot rolling mill from an inventory slab sequence and a direct slab sequence comprising:
    a computer usable medium having computer usable program code embodied therewith, the computer usable program code comprising:
    computer usable program code configured to represent data of the inventory slab sequence and data of the direct slab sequence on a storage means of the computer as a data structure arranged respectively in first and second directions;
    computer usable program code configured to form a grid graph having intersections as nodes, from the data of the inventory slab sequence in the first direction and the data of the direct slab sequence in the second direction, wherein each node in the grid graph includes both: (a) an inventory slab subnode for an inventory slab in an i position of the inventory slab sequence, wherein i is an integer; and (b) a direct slab subnode for a direct slab in a j position of the direct slab sequence, wherein j is an integer;
    computer usable program code configured to weight edges in the grid graph based on attributes of each slab in the inventory slab sequence and attributes of each slab in the direct slab sequence, wherein the weighting is performed using three indices that are inter-slab connectivity, a hot rolling idle time, and a direct slab wait time, said weight of each edge in the grid graph being calculated as a function of said three indices, an indice having a direct slab or inventory slab and corresponding direct slab subnode or inventory slab subnode as arguments;
    computer usable program code configured to determine a combined slab sequence of the inventory slab sequence and the direct slab sequence, by a shortest path search through a sequence of nodes from a start point to an end point in the weighted grid graph, said shortest path search traversing through either one of: said inventory slab subnode or said direct slab subnode at each node of said sequence;
    wherein the inter-slab connectivity is determined by the function:
    connectivity(slab1, slab2):=C1*abs(slab1.width−slab2.width)+C2*abs(slab1.thickness−slab2.thickness); and wherein slab1.width is width of slab1, slab2.width is width of slab 2, slab1.thickness is thickness of slab1, slab2.thickness is thickness of slab2, and
    wherein C1 and C2 are positive constants and abs is a function that returns an absolute value; and using the combined slab sequence to schedule feeding slabs to the hot rolling mill.

9. The computer program product according to claim 8, wherein the shortest path search is Dijkstra's algorithm.

10. The computer program product according to claim 8, wherein the computer usable program code is further configured to execute generating a child node corresponding to an inventory slab and a child node corresponding to a direct slab, respectively for the inventory slab subnode and the direct slab subnode.

11. The method according to claim 10, further comprising: calculating a child node attribute for each said child node corresponding to an inventory slab and corresponding to a direct slab, at least one of said three indices being a function of said child node attribute.

12. The computer program product according to claim 8, wherein a node-to-node transition takes one of four paths in said weighted graph.

13. The computer program product according to claim 8, wherein said function of said three indices is a summation of the three indices to which a weight is assigned.

14. The computer program product according to claim 8, wherein said weight of each edge in the grid graph is a value that varies along a continuum based upon said three indices.

15. A system for determining a sequence of slabs fed to a hot rolling mill from an inventory slab sequence and a direct slab sequence according to processing of a computer, comprising:
- a memory storage device for storing data of the inventory slab sequence and data of the direct slab sequence;
- a processing device operatively connected to said memory storage device and configured for performing a method comprising:
  representing the data of the inventory slab sequence and the data of the direct slab sequence on the storage means of the computer as a data structure arranged respectively in first and second directions;
  forming a grid graph having intersections as nodes, from the data of the inventory slab sequence in the first direction and the data of the direct slab sequence in the second direction, wherein each node in the grid graph includes both: (a) an inventory slab subnode for an inventory slab in an i position of the inventory slab sequence, wherein i is an integer; and (b) a direct slab subnode for a direct slab in a j position of the direct slab sequence, wherein j is an integer;
  weighting edges in the grid graph based on attributes of each slab in the inventory slab sequence and attributes of each slab in the direct slab sequence, wherein the weighting is performed using three indices that are inter-slab connectivity, a hot rolling idle time, and a direct slab wait time, said weight of each edge in the grid graph being calculated as a function of said three indices, an indice having a direct slab or inventory slab and corresponding direct slab subnode or inventory slab subnode as arguments;
  determining a combined slab sequence of the inventory slab sequence and the direct slab sequence, by a shortest path search through a sequence of nodes from a start point to an end point in the weighted grid graph, said shortest path search traversing through either one of: said inventory slab subnode or said direct slab subnode at each node of said sequence;
  wherein the inter-slab connectivity is determined by the function:
  connectivity(slab1, slab2):=$C1*abs(slab1.width-slab2.width)+C2*abs(slab1.thickness-slab2.thickness)$; and wherein slab1.width is width of slab1, slab2.width is width of slab 2, slab1.thickness is thickness of slab1, slab2.thickness is thickness of slab2, and
  wherein C1 and C2 are positive constants and abs is a function that returns an absolute value; and using the combined slab sequence to schedule feeding slabs to the hot rolling mill.

16. The system according to claim 15, wherein the shortest path search is Dijkstra's algorithm.

17. The system according to claim 15, wherein said processor device is further configured to perform
generating a child node corresponding to an inventory slab and a child node corresponding to a direct slab, respectively for the inventory slab subnode and the direct slab subnode.

18. The system according to claim 15, wherein said weight of each edge in the grid graph is a value that varies along a continuum based upon said three indices.

* * * * *